I. I. DUFFY.
DISK WHEEL RIM.
APPLICATION FILED JUNE 12, 1920.
1,417,506.
Patented May 30, 1922.
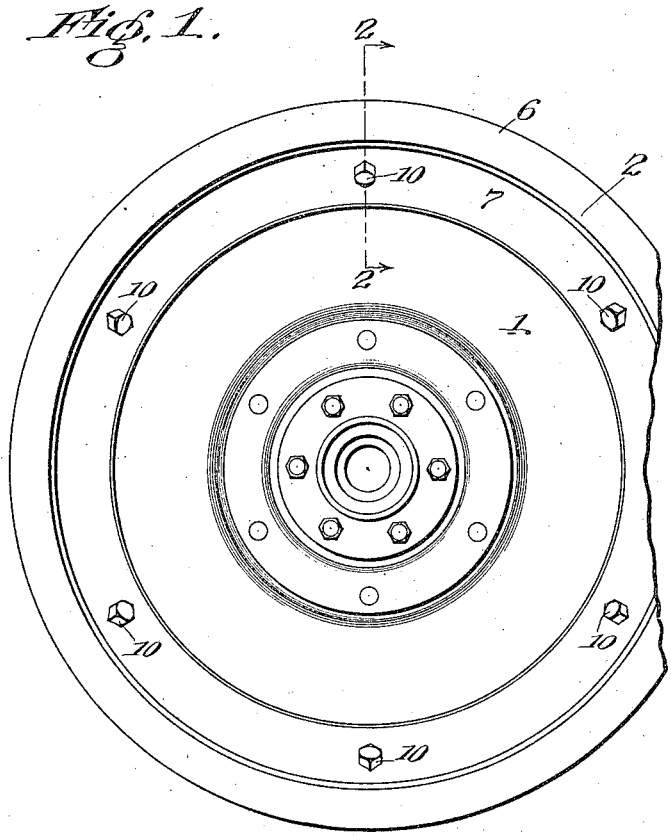
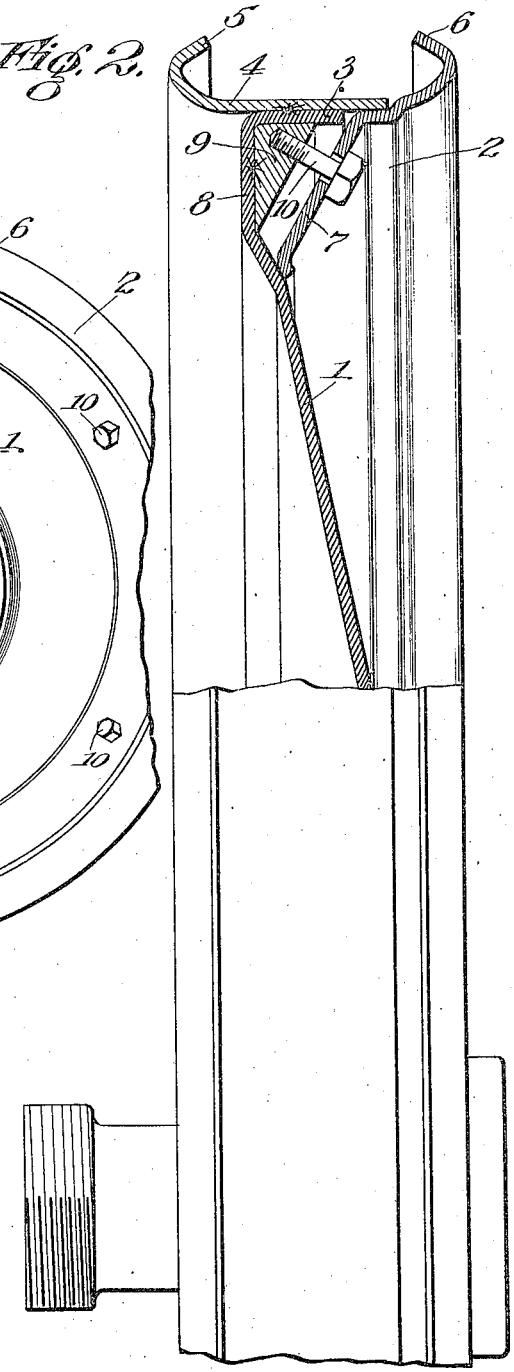
WITNESS
P. J. Gathmann
INVENTOR
Thomas I. Duffy.
BY
Burton & Burton
HIS ATTORNEYS.

UNITED STATES PATENT OFFICE.

THOMAS I. DUFFY, OF CHICAGO, ILLINOIS, ASSIGNOR, BY DIRECT AND MESNE ASSIGNMENTS, TO NELS GROSS, OF CHICAGO, ILLINOIS.

DISK-WHEEL RIM.

1,417,506.     Specification of Letters Patent.     Patented May 30, 1922.

Original application filed November 15, 1919. Serial No. 338,335. Divided and this application filed June 12, 1920. Serial No. 388,477.

*To all whom it may concern:*

Be it known that I, THOMAS I. DUFFY, a citizen of the United States, residing in the city of Chicago, in the county of Cook and the State of Illinois, have invented certain new and useful Improvements in Disk-Wheel Rims, of which the following is a specification, reference being had to the accompanying drawings, forming a part thereof.

This application is a division of my pending application, Serial No. 338,335, filed November 15, 1919.

The purpose of this invention is to provide improvement in disk wheels, particularly with respect to the rim or seat for the tire. It consists in the elements and features of construction shown and described, as indicated in the claims.

In the drawings:

Figure 1 is an inner side elevation of a wheel embodying this invention.

Figure 2 is a section at the line, 2—2, on Figure 1.

In the structure shown in the drawings the wheel comprises in lieu of spokes, a disk web, 1, to which the parts are secured which constitute a two-part rim or tire piece. The disk, 1, is formed with a peripheral flange, 3, to afford securement to it of the rim members. Said rim members comprise the member, 4, which is provided with a single lateral tire-retaining flange, 5, while the other tire-retaining flange, 6, is formed on a separate element, 2, of annular form which has a portion, 7, which extends obliquely from the retaining flange, 5, into contact with the web, 1, of the wheel. Said web is shaped substantially as shown in Figure 2 to provide the flange, 3, above mentioned, for permanent securement thereto of the rim member, 4; but in the angle between the flange, 3, and the annular portion, 8, of the web, there is welded or otherwise secured a block, 9, bored and threaded to receive a clamp screw, 10, extending through an aperture in the oblique portion, 7, of the rim member 2 having the flange, 6. By providing a plurality of such screws, 10, and either providing a plurality of blocks, 9, or forming such blocks in a continuous ring suitably secured in the angle of the disk and its flange, 3, the separable rim member can be drawn into place or readily removed to permit removal of the tire. The oblique arrangement of the annular part, 7, serves to stiffen the connection between the disk and the rim and gives the disk a broader footing on the rim.

I claim:

1. In a vehicle wheel, a rim member comprising a member formed with a tire-retaining flange at one edge, in combination with a web of the wheel at the circumference of which the rim member is rigidly positioned, said web extending from the rim in a plane offset from the middle toward the flanged edge of said rim member, and a removable rim member formed with an opposing tire-retaining flange and having an annular part which extends into lodgment against the wheel web at a distance inward from the rim toward the wheel center, and fastening screws which clamp said annular part of said second rim member at its greater and lesser circumferences respectively, against the margin of the first rim member opposite the flange thereof and against the wheel web at a distance inward from the rim.

2. In a vehicle wheel in combination with an annular web member positioned generally in the mid-transaxial plane of the wheel, a rim member formed with a tire-retaining flange at one edge and secured to the web member at the outer periphery of the latter, and a removable rim member formed with an opposing tire-retaining flange and an annular portion, said annular portion extending obliquely from the tire-retaining flange of said member inward with respect to the wheel and toward said mid-plane and into contact with the web of the wheel, and threaded means secured in the angle between the web of the wheel and said first mentioned rim member to receive fastening means passing through said oblique annular portion.

3. In a vehicle wheel, in combination with a disk-like web member having a peripheral portion offset laterally from the portion interior thereto, and having a peripheral flange extending from said offset portion toward said mid-plane; a rim member formed with a tire-retaining flange and seated on said flange of the web member; a removable rim member having a counterpart tire-retaining flange and an annular portion extending obliquely from said flange inward with respect to the wheel and toward the plane of the opposite tire-retaining flange, and seated on the web member at a distance inward from the tire seat; whereby there is enclosed between said annular flange and the tire seat at the web member a space which in radial section of the wheel is in general triangular, and fastening means extending through said oblique annular portion into said triangular space to secure the removable rim member to the web and clamp said annular flange toward the opposite angle of said triangular space.

In testimony whereof, I have hereunto set my hand at Chicago, Illinois, this 7th day of June, 1920.

THOMAS I. DUFFY.